(12) United States Patent
Zhou (10) Patent No.: US 12,504,184 B1
(45) Date of Patent: Dec. 23, 2025

(54) VENTILATION ROOFTOP AIR-CONDITIONING SYSTEM

(71) Applicant: velit cooling & heating. LLC, Spokane, WA (US)

(72) Inventor: Xiaoyue Zhou, Issaquah, WA (US)

(73) Assignee: velit cooling & heating. LLC

( * ) Notice: Subject to any disclaimer, the term of this patent is extended or adjusted under 35 U.S.C. 154(b) by 0 days.

(21) Appl. No.: 19/334,968

(22) Filed: Sep. 22, 2025

(30) Foreign Application Priority Data

Sep. 15, 2025 (CN) .......................... 202521973821.3

(51) Int. Cl.
*F24F 7/02* (2006.01)
*F24F 13/08* (2006.01)
*F24F 13/20* (2006.01)

(52) U.S. Cl.
CPC ............ *F24F 7/025* (2013.01); *F24F 13/082* (2013.01); *F24F 13/20* (2013.01); *F24F 2221/16* (2013.01)

(58) Field of Classification Search
CPC .......... F24F 7/025; F24F 13/082; F24F 13/20; F24F 2221/16; F24F 7/02; F24F 7/10; F24F 13/08; F24F 11/81; F24F 2140/40; B60H 2001/00235; B60H 1/245; B60H 1/262
USPC ......................................................... 454/341
See application file for complete search history.

(56) References Cited

U.S. PATENT DOCUMENTS

| | | | | |
|---|---|---|---|---|
| 1,983,979 A * | 12/1934 | Graham | ............. | B60H 1/00464 454/117 |
| 2,372,164 A * | 3/1945 | Woodhams | ............. | B60H 1/262 454/94 |
| 3,867,486 A * | 2/1975 | Nagele | ....................... | F24F 6/04 261/106 |
| 3,978,174 A * | 8/1976 | Peer | ........................ | F24F 6/06 261/DIG. 4 |
| 4,522,115 A * | 6/1985 | Kelly | ...................... | B60H 1/26 454/94 |
| 10,336,160 B2 * | 7/2019 | Vergamini | ........... | B60H 1/3202 |
| 10,589,593 B2 * | 3/2020 | Westendarp | ....... | B60H 1/00428 |
| 2004/0221595 A1* | 11/2004 | Hille | .................. | B60H 1/00471 62/428 |
| 2004/0221598 A1* | 11/2004 | Hille | .................. | B60H 1/00542 62/244 |

(Continued)

FOREIGN PATENT DOCUMENTS

DE          19853767 C1 *  1/2000  ............. B60H 1/262

OTHER PUBLICATIONS

Entenmann, Karin, DE19853767 Translation.pdf, "Motor vehicle roof with air conditioning", Jan. 2000, pp. 1-9.*

*Primary Examiner* — Avinash A Savani
*Assistant Examiner* — Ryan L Faulkner
(74) *Attorney, Agent, or Firm* — Che-Yang Chen (57) ABSTRACT

A ventilation rooftop air-conditioning system includes a housing unit, an air blower unit and an air-conditioning unit, wherein the housing unit includes a main body and a lid body, and a fixing element is disposed in the interior of the main body, and the interior of the main body is divided into a circulation channel and a ventilation channel by the fixing element, and an evaporator is disposed on the fixing element; wherein the ventilation rooftop air-conditioning system has a ventilation mode in which air flows in the ventilation channel and does not pass through the evaporator and a circulation mode in which air passes through the circulation channel, the evaporator and the ventilation channel in turn.

13 Claims, 12 Drawing Sheets

(56) References Cited

U.S. PATENT DOCUMENTS

2005/0003751 A1* 1/2005 Thomas ............ B60H 1/00364
454/136

* cited by examiner

VENTILATION ROOFTOP AIR-CONDITIONING SYSTEM

FIELD OF THE INVENTION

The present invention relates to the technical field of rooftop air-conditioners, and more particularly to a ventilation rooftop air-conditioning system.

BACKGROUND OF THE INVENTION

Recreational vehicles, caravans and other vehicles on the market are usually equipped with a rooftop air-conditioner and a ventilation device because such vehicles may be parked for a long time to rest. The rooftop air-conditioner is an air-conditioning system designed for scenarios when the vehicle engine is turned off. The rooftop air-conditioner operates independently through direct current (DC) power supply from an on-board battery of the vehicle, and can also function normally with the engine off. During operation, the rooftop air-conditioner makes the air in the interior of the vehicle circulate and pass through the evaporator, so as to quickly cool or heat the interior, and then adjusts the temperature in the interior. The ventilation device enables the airflow between the interior and the exterior, of the vehicle, and then purifies the air in the interior of the vehicle. Furthermore, the ventilation device can also be used with a high efficiency particulate air filter (HEPA filter) and suchlike to filter out harmful substances such as formaldehyde and tiny particles.

However, the conventional independently installed rooftop air-conditioners and ventilation devices still have some disadvantages.

1. As two separate devices installed in the vehicle, the rooftop air conditioner and the ventilation device are limited by the installation space, which easily leads to layout conflicts, higher installation difficulty, and greater space occupation.

2. Since the rooftop air-conditioner and the ventilation device operate independently, each requires its own motor, fan, and control unit, etc. In addition, during maintenance, each needs to be checked and replaced separately, resulting in high manufacturing and maintenance costs.

Therefore, how to design a ventilation rooftop air-conditioning system that can both regulate temperature and purify air, while reducing space occupation and lowering use costs, and at the same time improving user experience, is a technical problem that designers need to solve.

SUMMARY OF THE INVENTION

In view of the deficiencies of the prior art, the present invention provides a ventilation rooftop air-conditioning system which can reduce space occupation, lower use costs, and at the same time improve user experience while taking into account temperature regulation and air purification.

The objective of the present invention is achieved through the following technical solutions.

A ventilation rooftop air-conditioning system, comprising:

a housing unit comprising a main body, a lid body and a fixing element disposed in the main body to define a circulation channel and a ventilation channel, wherein the circulation channel has an air inlet, and the ventilation channel has an upper air vent and a lower air vent, wherein the upper air vent is opened or closed by means of the lid body;

an air blower unit disposed between the upper vent and the lower air vent; and an air-conditioning unit which comprises an evaporator which is disposed on the fixing element, wherein the circulation channel is communicated to the ventilation channel through the evaporator;

wherein the ventilation rooftop air-conditioning system has a ventilation mode in which air flows in the ventilation channel and does not pass through the evaporator and a circulation mode in which air passes through the circulation channel, the evaporator and the ventilation channel in turn.

According to an embodiment, the ventilation channel has an upper area and a lower area, and the air blower unit is disposed between the upper area and the lower area, and the evaporator is disposed within the upper area.

According to an embodiment, the air-conditioning unit comprises a first filtering element and a second filtering element, and the first filtering element is disposed in the upper area, and the first filtering element is arranged to block the ventilation channel; the second filtering element is disposed in the circulation channel to block the circulation channel.

According to an embodiment, the fixing element has an extension portion which extends in a direction away from the ventilation channel, and the evaporator is connected to the extension portion, and at least part of the circulation channel forms a bent segment through the extension portion.

According to an embodiment, a ventilation area of the evaporator is a first ventilation area S1, and a ventilation area of the air inlet is a second ventilation area S2, and a ventilation area of the lower air vent is a third ventilation area S3, wherein S1>S2, and S1>S3.

According to an embodiment, the air blower unit comprises a reversible motor having an output shaft, a connecting frame and a plurality of blades, and the reversible motor is fixed and installed in the ventilation channel through the connecting frame, and the plurality of blades are arrayed on the output shaft of the reversible motor, and the reversible motor drives the plurality of blades to rotate clockwise or counterclockwise.

According to an embodiment, the air-conditioning unit comprises a condenser, a condensing fan and a compressor, and the condensing fan is disposed on the condenser, and the condenser is connected with the evaporator through the compressor.

According to an embodiment, the housing unit comprises a base, and the main body, the compressor and the condenser are mounted on the base, and at least part of the main body penetrates through the base.

According to an embodiment, the housing unit comprises a grille element which covers the air inlet.

According to an embodiment, the lower air vent is provided with a plurality of deflecting plates which are arrayed and arranged in parallel.

According to an embodiment, a rotating shaft and a lifting rod are set on the main body, and the lifting rod is configured to drive the lid body to rotate with respect to the rotating shaft to open or close the upper air vent.

According to an embodiment, an ascending and descending mechanism is disposed on the main body to drive the lid body to approach or move away from the upper air vent.

According to an embodiment, the ascending and descending mechanism is a cylinder, and a reciprocating shaft of the ascending and descending mechanism is connected with the lid body.

To sum up, the ventilation rooftop air-conditioning system according to the present invention decreases occupied spaces, reduces use costs and improves user experience while taking into account temperature regulation and air purification.

BRIEF DESCRIPTION OF THE DRAWINGS

In order to more clearly illustrate the technical solution of embodiments of the present invention, we shall briefly describe the figures required to be used in the embodiments.

Wherein, 10—ventilation rooftop air-conditioning system; 100—housing unit; 110—main body; 111—rotating shaft; 112—lifting rod; 113—ascending and descending mechanism; 1131—reciprocating shaft; 114—second support plate; 120—lid body; 121—first support plate; 130—fixing element; 131—extension portion; 140—circulation channel; 141—air inlet; 142—bent segment; 150—ventilation channel; 151—upper air vent; 152—lower air vent; 153—upper area; 154—lower area; 160—base; 170—grille element; 180—deflecting plate; 200—air blower unit; 210—reversible motor; 211—output shaft; 220—connecting frame; 230—blade; 300—air-conditioning unit; 310—evaporator; 320—condenser; 330—condensing fan; 340—compressor; 350—first filtering element; 360—second filtering element.

DETAILED DESCRIPTION OF SOME EMBODIMENTS

In order to facilitate the understanding of the present invention, we shall comprehensively describe the present invention with reference to the relevant figures as follows. A person skilled in the art can easily understand the other advantages and effects of the present invention from the contents disclosed in this specification. It should be noted that the structure, proportion, size, etc. drawn in the figures of this specification are only used to combine with the content revealed in the specification for a person skilled in the art to understand and read the content, and are not used to impose any limitations on the present invention, so they have no technical substantive significance. Any modification of structures, change of proportional relations or adjustment of sizes, without affecting the effect to be produced and the purpose to be achieved, by the present invention, shall still fall within the scope of the technical content revealed in the present invention. Furthermore, the terms cited in this specification, such as "up", "down", "left", "right" and "middle", only facilitate clear description, and are not used to impose any limitations on the scope of the present invention to be implemented by means of their relative relation changes or adjustments. In the absence of substantive changes in the technical content, it shall also be regarded as the scope of the present invention to be implemented.

Unless otherwise defined, all technical and scientific terms used herein have the same meanings as generally understood by a person skilled in the art. The terms used in the specification of the present invention herein are for the purpose of describing a specific embodiment and are not intended to impose any limitations on the present invention. The term "and/or" as used herein include any and all combinations of one or more items corresponding to it.

Figure 1:
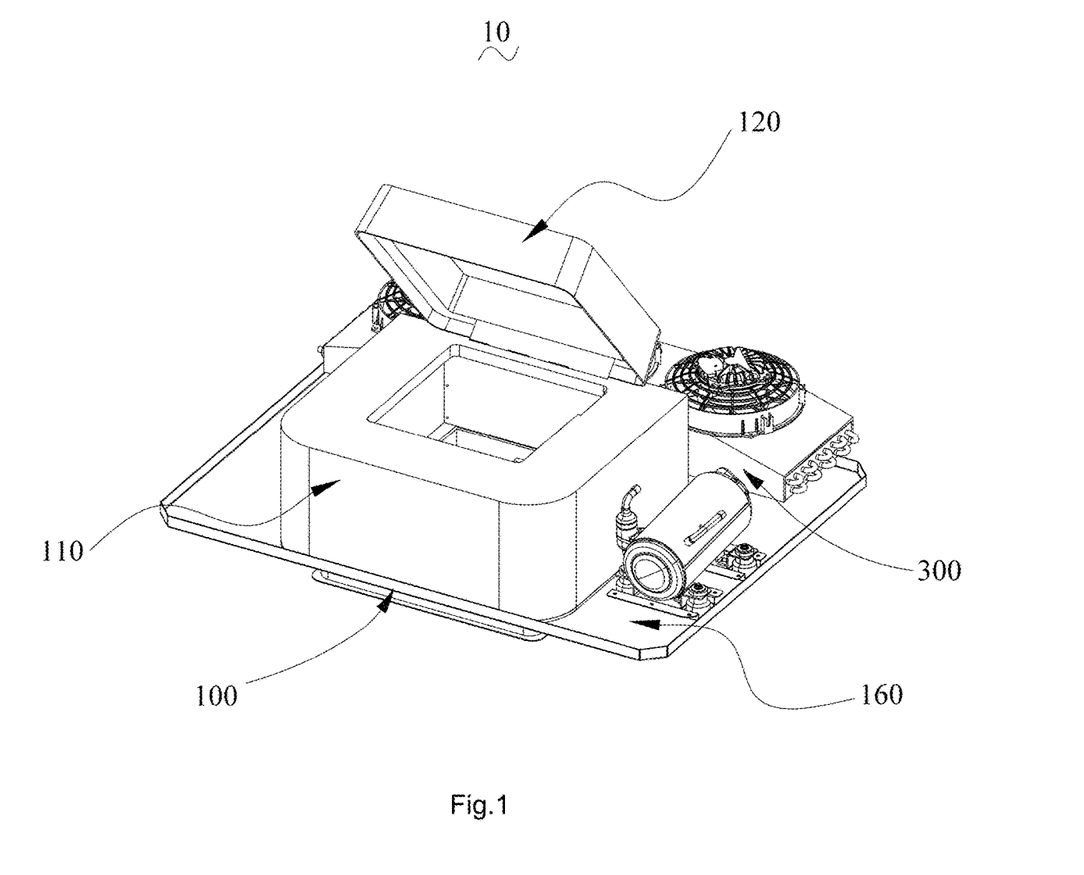
FIG. 1 is a schematic view of the ventilation rooftop air-conditioning system according to the present invention.
Figure 3:
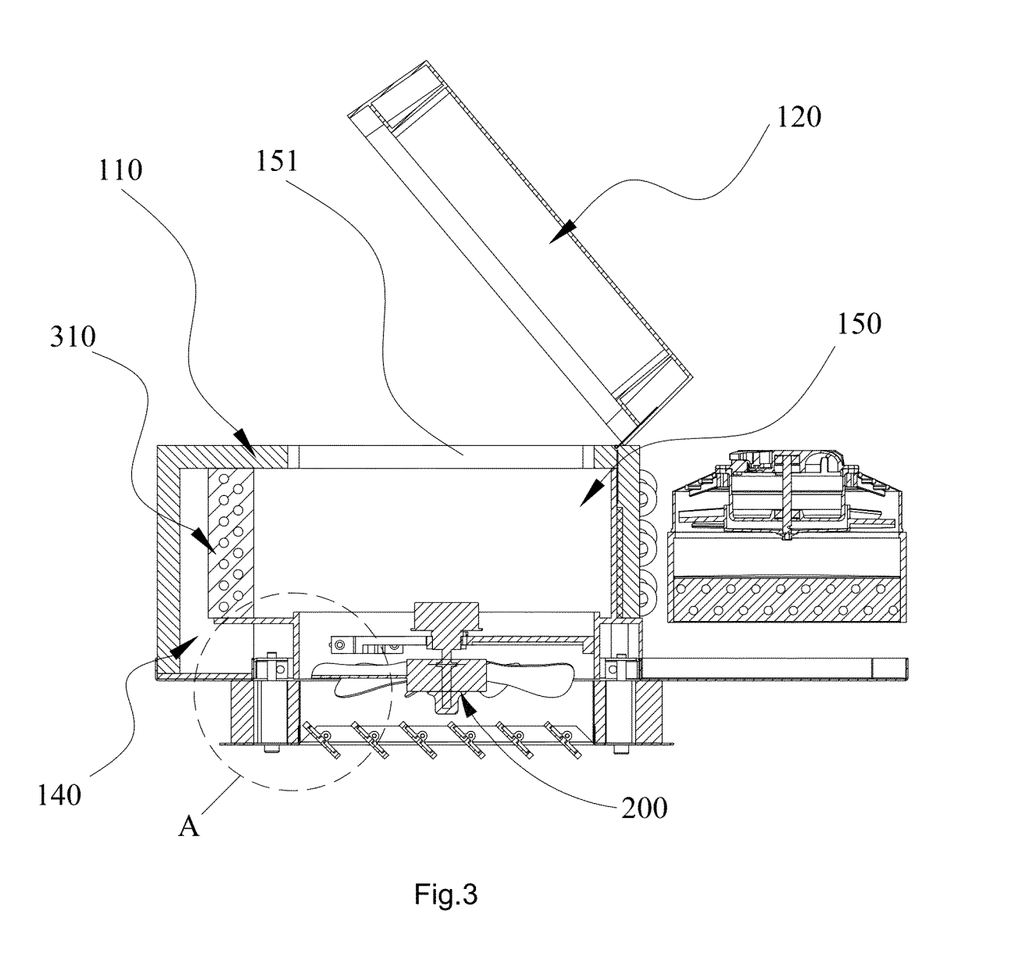
FIG. 3 is a first plan sectional view of the ventilation rooftop air-conditioning system shown in FIG. 1.

The ventilation rooftop air-conditioning system 10 according to the present invention decreases occupied spaces, reduces use costs and improves user experience while taking into account temperature regulation and air purification. As shown in FIG. 1 and FIG. 3, the ventilation rooftop air-conditioning system 10 comprises a housing unit 100, an air blower unit 200 and an air-conditioning unit 300.

Figure 2:
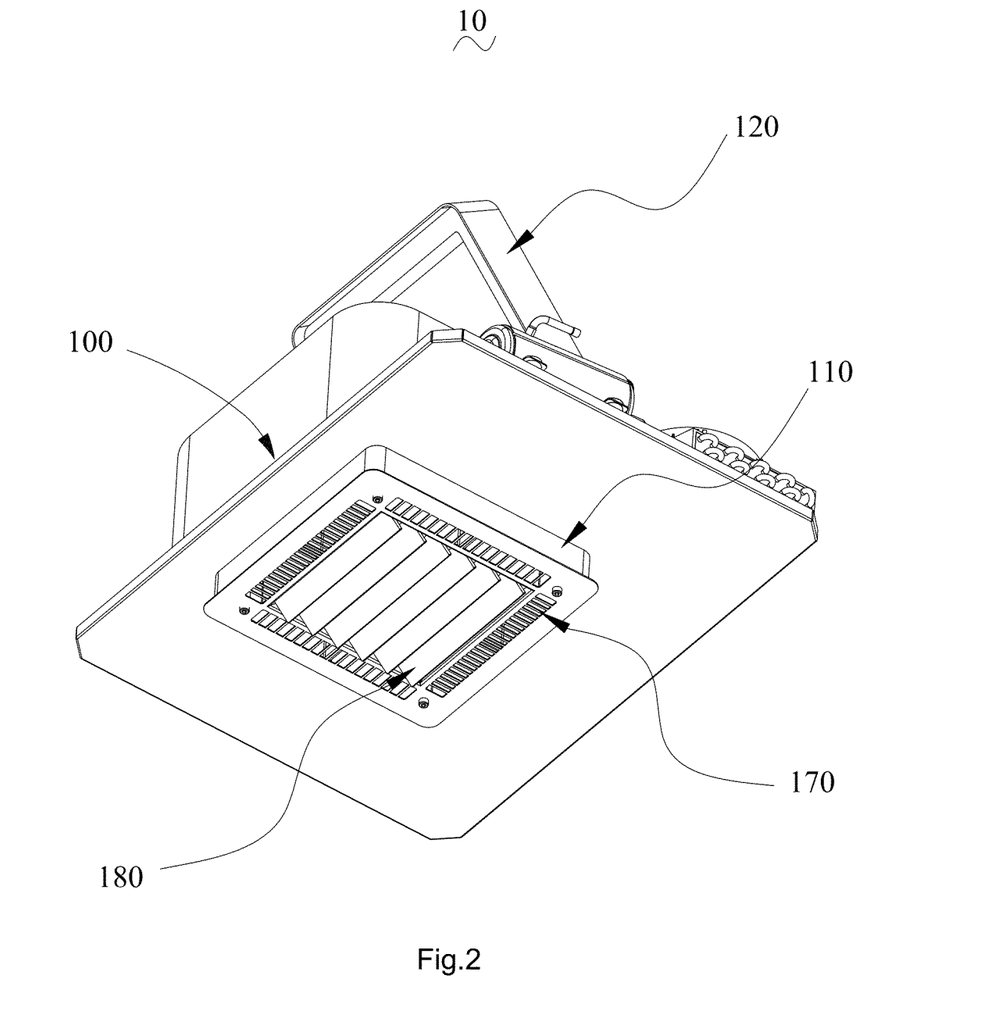
FIG. 2 is another schematic view of the ventilation rooftop air-conditioning system shown in FIG. 1.

As shown in FIGS. 1-3, the housing unit 100 comprises a main body 110 and a lid body 120, and a fixing element 130 is disposed in the interior of the main body 110, and the interior of the main body 110 is divided into a circulation channel 140 and a ventilation channel 150 by the fixing element 130, and the circulation channel 140 has an air inlet 141, and the ventilation channel 150 has an upper air vent 151 and a lower air vent 152, and the upper air vent 151 is opened or closed by means of the lid body 120. Preferably, the air inlet 141 is disposed around the lower air vent 152, that is, the air inlet 141 is circular and surrounds the lower air vent 152.

The air blower unit 200 is disposed between the upper vent 151 and the lower air vent 152.

Figure 5:
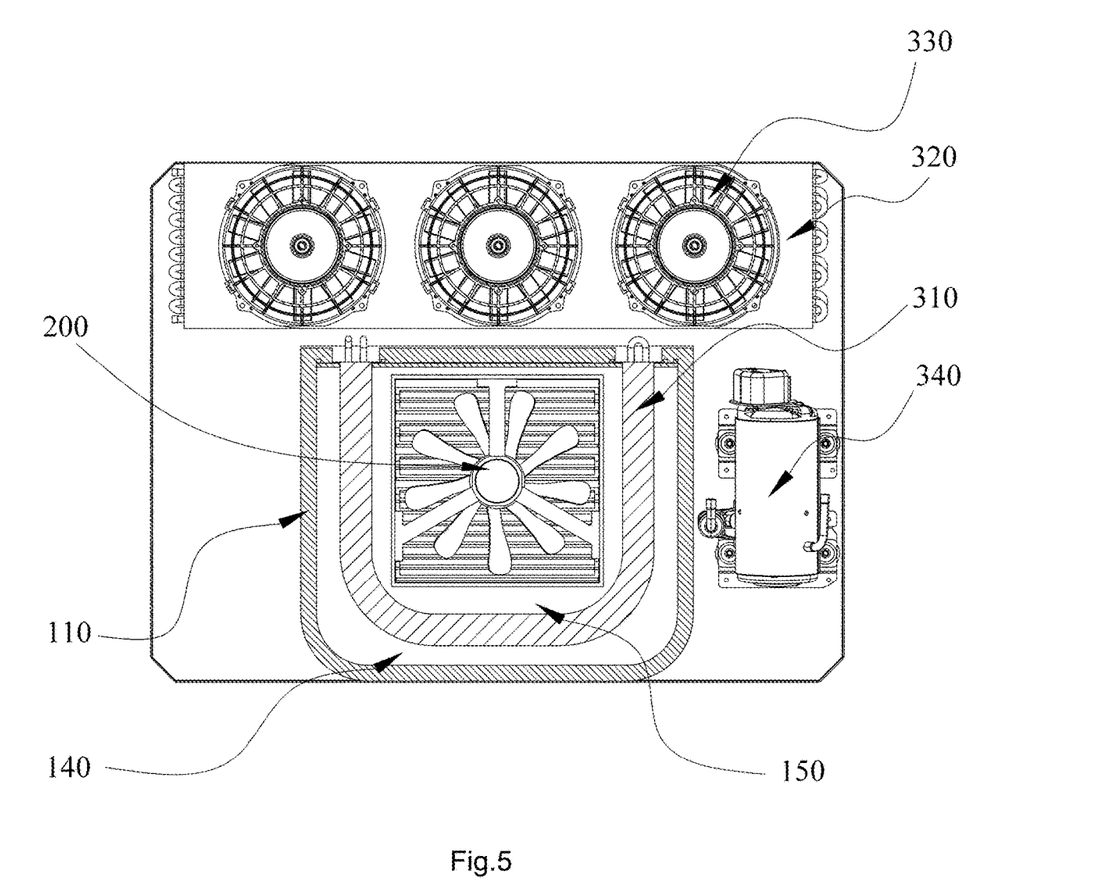
FIG. 5 is a second plan sectional view of the ventilation rooftop air-conditioning system shown FIG. 1.

The air-conditioning unit 300 comprises an evaporator 310 which is disposed on the fixing element 130, and the circulation channel 140 is communicated with the ventilation channel 150 via the evaporator 310. Preferably, as shown in FIG. 5, the evaporator 310 is disposed on the periphery of the ventilation channel 150.

The ventilation rooftop air-conditioning system 10 operates in a ventilation mode and a circulation mode. In the ventilation mode, a ventilation device enables an air flow in the ventilation channel 150 and the air flow does not pass through the evaporator 310, so as to realize an air circulation between the interior and the exterior of the vehicle; in the circulation mode, the air in the interior of the vehicle passes through the circulation channel 140, the evaporator 310 and the ventilation channel 150 in turn, so that the evaporator 310 performs heat absorption and heat release to cool or heat the air in the interior of the vehicle, and then adjusts the temperature in the interior of the vehicle.

Figure 10:
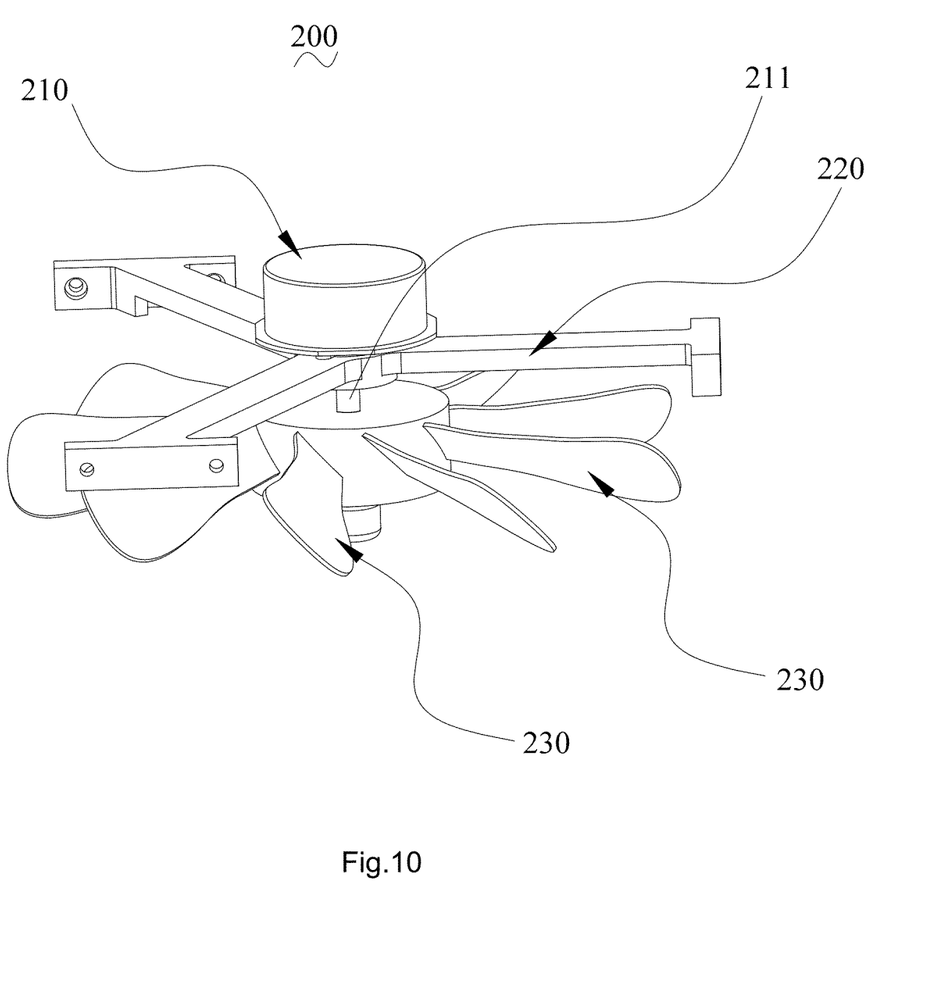
FIG. 10 is a schematic view of the air blower unit shown in FIG. 3.

Specifically, as shown in FIG. 10, the air blower unit 200 comprises a reversible motor 210, a connecting frame 220 and a plurality of blades 230, and the reversible motor 210 is fixed and installed in the ventilation channel 150 through the connecting frame 220, and the plurality of blades 230 are arrayed on an output shaft 211 of the reversible motor 210, and the reversible motor 210 drives the plurality of blades 230 to rotate clockwise or counterclockwise. Understandably, an airflow is generated when the reversible motor 210 is driving the plurality of blades 230 to rotate, and the directions of the airflow generated by the reversible motor 210 rotating clockwise and counterclockwise are opposite to each other. That is, the air blower unit 200 can generate an ascending airflow or a descending airflow to adapt to different operation modes.

Figure 4:
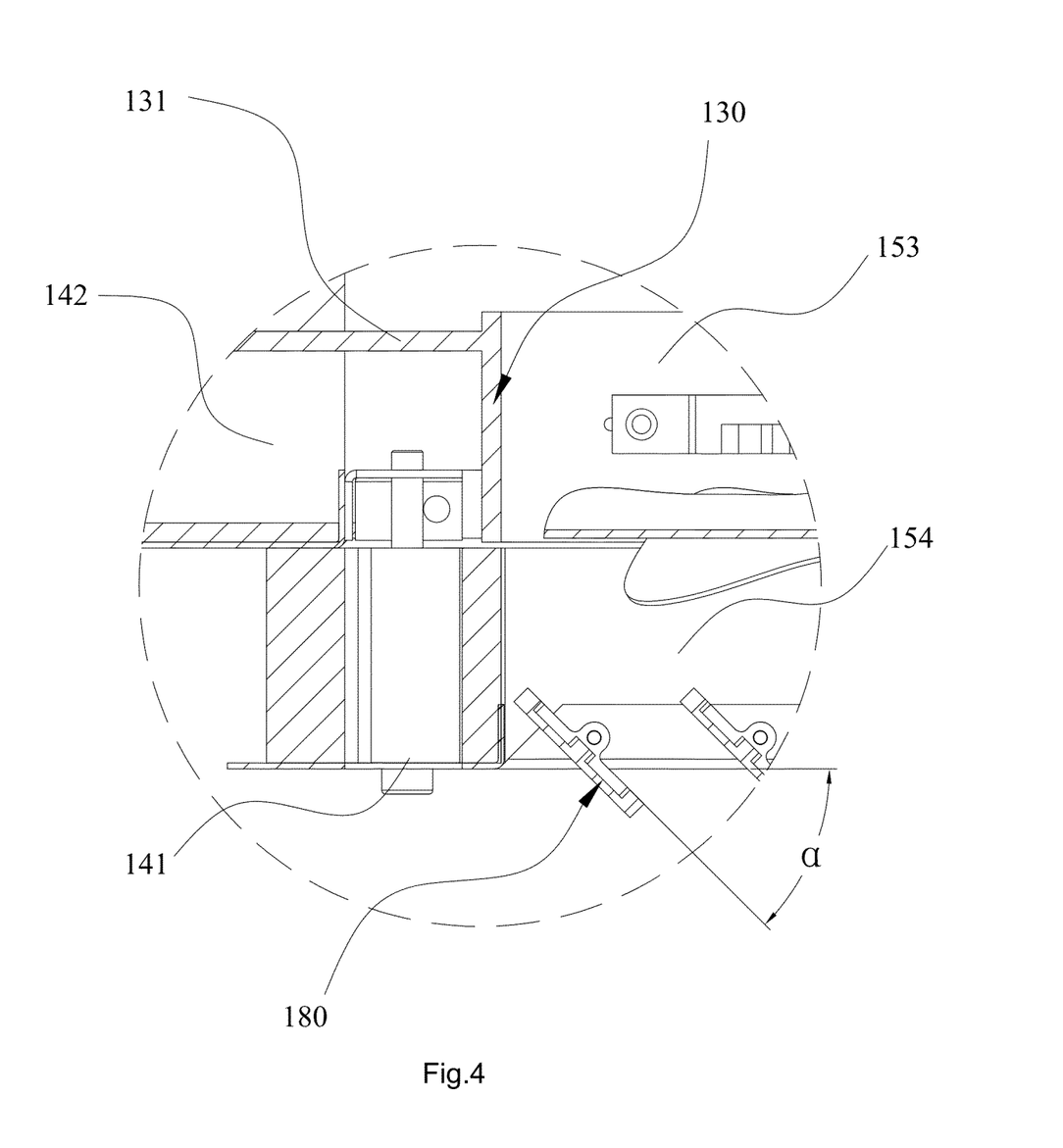
FIG. 4 is a partial enlarged view of an area A in FIG. 3.

In the present invention, as shown in FIGS. 3-4, the ventilation channel 150 has an upper area 153 and a lower area 154, and the air blower unit 200 is disposed between the upper area 153 and the lower area 154, and the evaporator 310 is disposed within the upper area 153. In the circulation mode, the upper air vent 151 is closed by means of the lid body 120, and the upper area 153 forms a relatively closed space, while the air blower unit 200 rotates to generate a descending airflow, so as to form a negative pressure within the upper area 153, which in turn provides a driving force for the air in the circulation channel 140 to pass through the evaporator 310.

Figure 6:
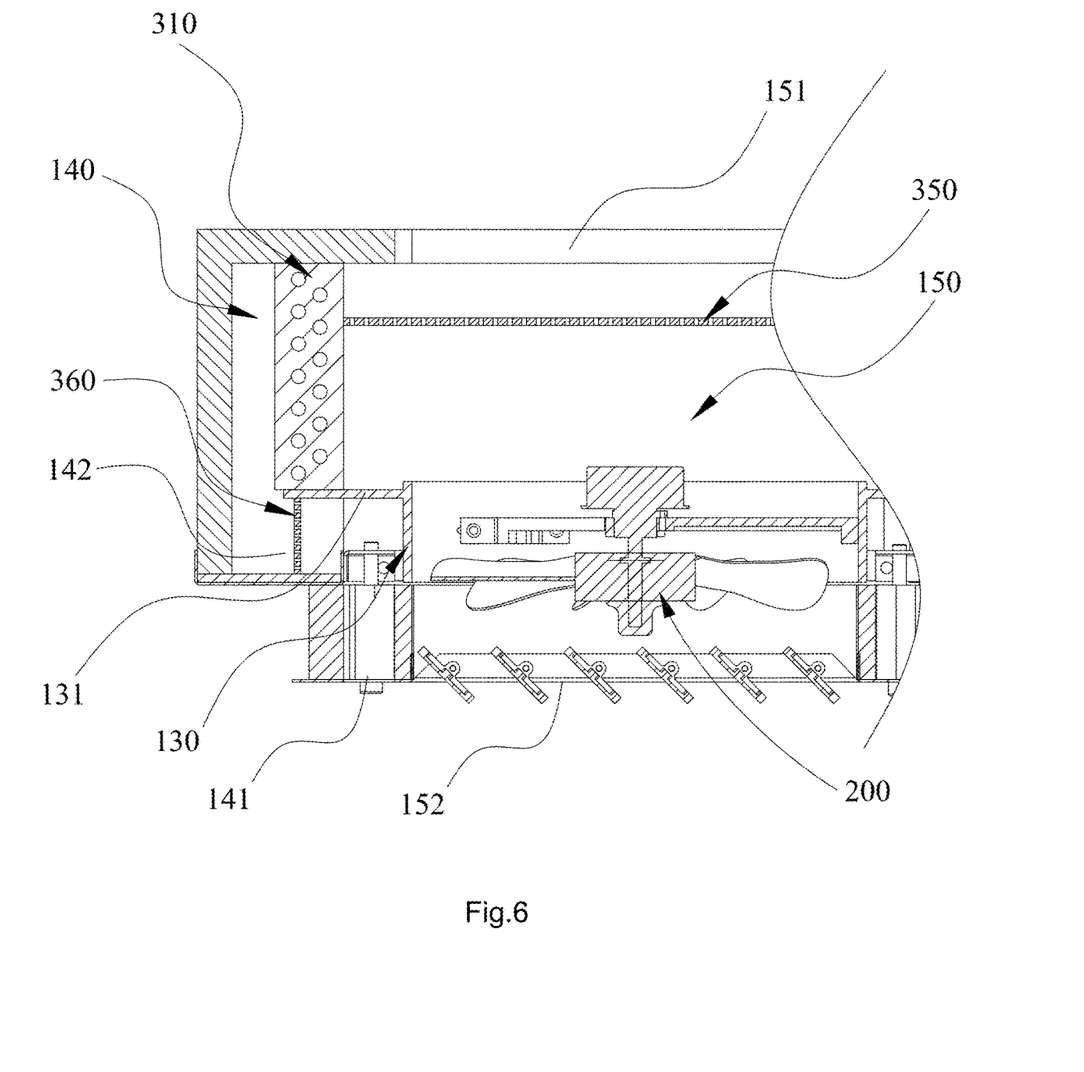
FIG. 6 is a partial view of the ventilation rooftop air-conditioning system shown in FIG. 1.

Referring to FIG. 3 and FIG. 6, the working principle of the ventilation rooftop air-conditioning system 10 according to the present invention is described in conjunction with the above structure.

During operation, the user can adjust operation modes of the ventilation rooftop air-conditioning system 10 according to needs.

In the ventilation mode, the ventilation rooftop air-conditioning system 10 operates in two operation states: a ventilation state and an exhaust state state.

In the exhaust state state, the lid body 120 is in an open state, the upper air vent 151 is in an open state, and the reversible motor 210 drives the blades 230 to rotate counterclockwise to generate an ascending airflow, so that the air in the interior of the vehicle enters the ventilation channel 150 through the lower air vent 152, and then is discharged to the exterior through the upper air vent 151, so that the dirty air in the interior of the vehicle is expelled to the outside to achieve the exhaust function.

In the ventilation state, the lid body 120 is in an open state, the upper air vent 151 is in an open state, and the reversible motor 210 drives the blades 230 to rotate clockwise to generate a descending airflow, so that outside air enters the ventilation channel 150 through the upper air vent 151, and then enters the interior of the vehicle through the lower air outlet 152, so that the outside air is drawn into the interior of the vehicle to achieve the function of providing ventilated air.

In the circulation mode, the lid body 120 is in a closed state, and the upper air vent 151 is closed by means of the lid body 120, and the reversible motor 210 drives the blades 230 to rotate clockwise to generate a descending airflow, so that the air in the interior of the vehicle is drawn into the circulation channel 140 through the air inlet 141, and then enters the ventilation channel 150 through the evaporator 310, and finally returns to the interior of the vehicle through the lower air vent 152; during this process, the evaporator 310 absorbs or releases heat, and performs heat exchange with flowing air, that is, cooling or heating, so as to adjust the temperature in the interior of the vehicle and achieve the function of temperature regulation.

It should be noted that compared with the prior art, the ventilation rooftop air-conditioning system 10 according to the present invention has the following advantages.

1. The user may select the ventilation mode or the circulation mode of the ventilation rooftop air-conditioning system 10 according to needs, thereby achieving the functions of fresh-air supply, exhaust, or temperature regulation, making the system suitable for multiple scenarios and improving user experience.

2. The ventilation device and the parking air conditioner are integrated into one device. During installation, only the ventilation rooftop air conditioning system 10 needs to be installed, with no need for additional devices. This avoids layout conflicts caused by limited installation space, simplifies installation, reduces overall volume, and minimizes occupied space.

3. The two modes of the ventilation rooftop air-conditioning system 10 share the same air blower unit 200, and it is only necessary to inspect and replace the air blower unit 200 during maintenance, thereby reducing manufacturing costs and maintenance costs.

Figure 8:
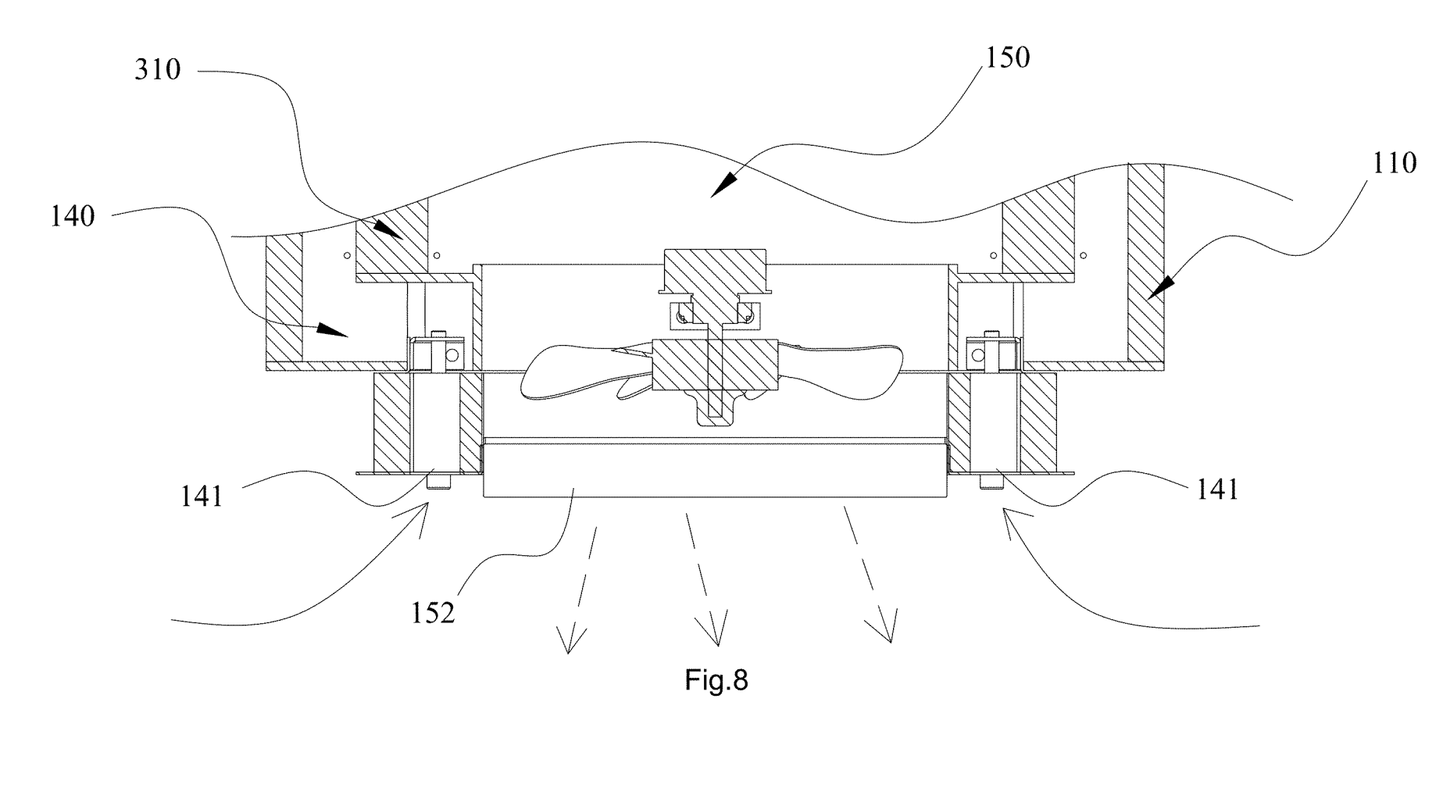
FIG. 8 is a schematic view illustrating an airflow path in the ventilation rooftop air-conditioning system according to the present invention.

Furthermore, in the present invention an airflow path is further taken into consideration. Specifically, hot air trends to flow upwards and mostly gathers in the upper space of the interior of the vehicle, while cold air trends to flow downwards. In the circulation mode, the air inlet 141 is used to suction hot air and the lower air vent 152 is used to discharge cooled air. In the present invention the air inlet 141 is disposed around the lower air vent 152, and paths of the hot airflow and the cold airflow during circulation is shown in FIG. 8; that is, the hot air in the upper space of the interior of the vehicle is suctioned into the circulation channel 140 from the air inlet 141, then cooled by the evaporator 310 to form cold air, and then discharged through the lower air vent 152. In this case, the path of the hot airflow (as shown by the solid line arrow in FIG. 8) and the path of the cold airflow (as shown by the dotted arrow in FIG. 8) are independent of each other and will not interfere with each other.

Figure 9:
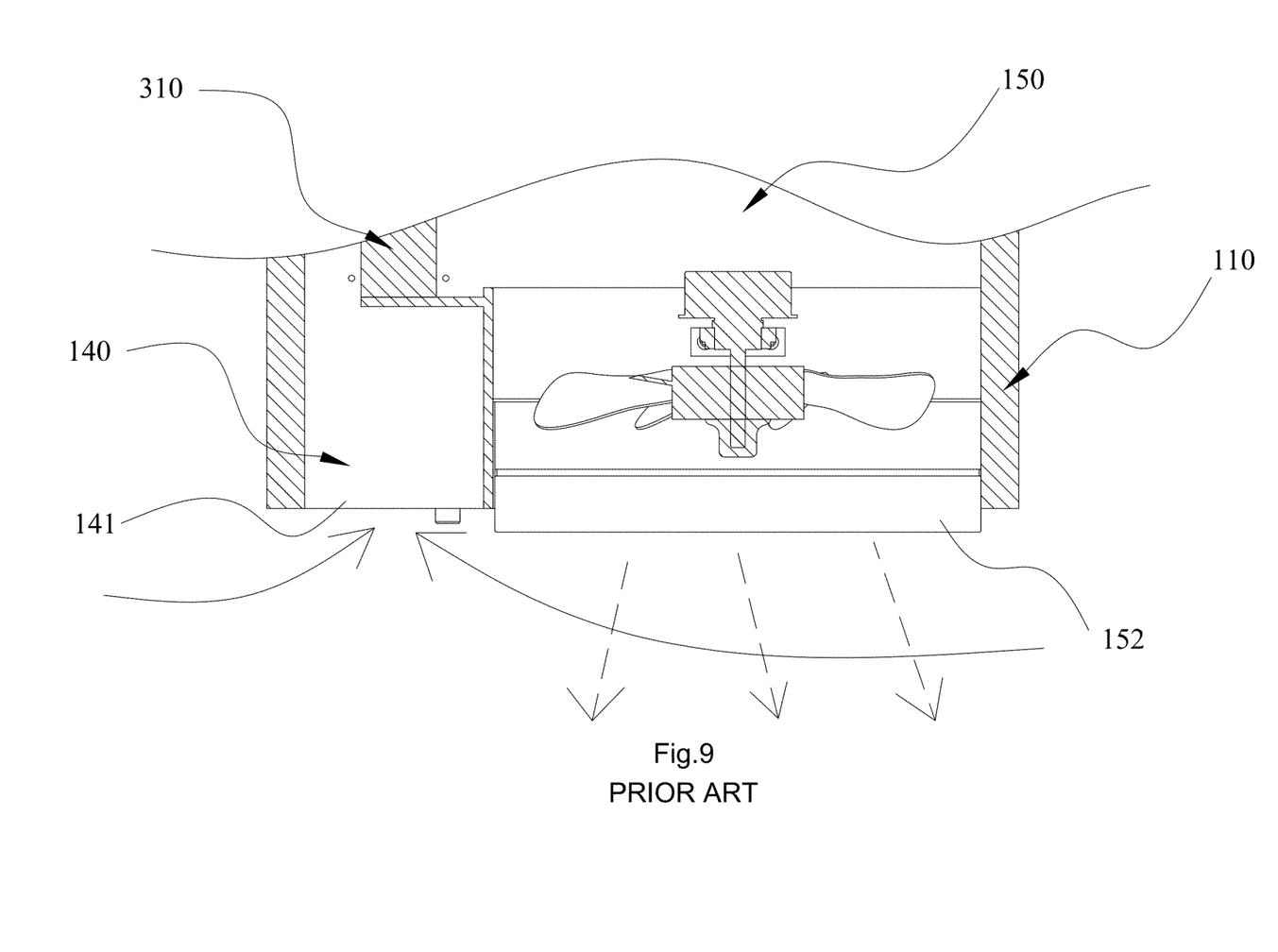
FIG. 9 is a schematic view illustrating the airflow path in a conventional air-conditioning system.

By contrast, if the air inlet 141 and the lower air vent 152 are arranged side by side (as shown in FIG. 9), that is, the air inlet 141 does not surround the lower air vent 152. During circulation, the hot air in the upper space of the vehicle is suctioned into the circulation channel 140 from the air inlet 141, and the cold air is discharged from the lower air vent 152. In this case, as shown in FIG. 9, the path of the hot airflow (as shown by the solid line arrow in FIG. 9) and the path of the cold airflow (as shown by the dotted arrow in FIG. 9) interfere with each other, affecting the flow efficiency and the effect of temperature regulation.

Therefore, by way of designing the positions of the air inlet 141 and the lower air vent 152 of the present invention, it is possible to ensure that the paths of the hot airflow and the cold airflow are independent of each other without interference, thereby improving the flow efficiency and the effect of temperature regulation for the ventilation rooftop air-conditioning system 10.

Furthermore, in the present invention, the position of the evaporator 310 is specially designed as follows.

Understandably, since more impurities and dust exist in an environment and outside air is often allowed to pass through the evaporator 310 in the prior art, this design causes the impurities and dust in air to easily adhere to the evaporator 310, and thus affects the effect of cooling or heating air by means of the evaporator 310, and requires the user to clean the evaporator 310 frequently, thereby diminishing the user experience. In the present invention the evaporator 310 is disposed on the periphery of the ventilation channel 150, and in the ventilation mode, outside air flows through the ventilation channel 150 without passing through the evaporator 310, thereby solving the problem that impurities and dust in air adhere to the evaporator 310.

In addition, in the prior art, when air passes through the evaporator 310, the evaporator 310 will form a certain obstruction to the airflow. Assuming that the evaporator 310 is set in the ventilation channel 150, it will cause the air to not pass through the ventilation channel 150 smoothly, thereby affecting the effect of airflow in the ventilation state or in the exhaust state state. In the present invention, the evaporator 310 is disposed on the periphery of the ventilation channel 150, and there is no other structure in the ventilation channel 150 except for the inevitable air blower unit 200. In the ventilation mode, air can pass smoothly through the ventilation channel 150, while the evaporator 310 can prevent backflow into the circulation channel 140, that is, the evaporator 310 can perform a guiding effect on the air.

Therefore, in the present invention, by way of designing the evaporator 310, on the one hand, it is possible to prevent the impurities and dust in air from adhering to the evaporator 310 and improve the cooling and heating effect to the air by the evaporator 310 air as well as user experience. On the other hand, in the ventilation mode, the evaporator 310 will not hinder the airflow in the ventilation channel 150, and has a guiding effect to the air, so as to enable air to smoothly flow.

A Chinese invention patent (public number: CN110450606A, titled "top-mounted rooftop air-conditioning system assembly for ventilation, purification and refrigeration"), discloses a top-mounted rooftop air-conditioning system assembly for ventilation, purification and refrigeration, which can not only cool, but also ventilate and purify air, achieving multiple functions. However, the top-mounted rooftop air-conditioning system assembly for ventilation, purification and refrigeration in the prior art is not equipped with a means for slowing airflow, so it cannot slow down the airflow passing through an evaporator, resulting in a problem that the air is not fully cooled or heated before it is discharged, and the temperature regulation performance is poor.

Compared with the above-mentioned prior art, the present invention provides a special design to avoid those poor performances, so as to solve the above problem.

As shown in FIG. 6, the fixing element 130 comprises an extension portion 131 which extends in the direction away from the ventilation channel 150, and the evaporator 310 is connected to the extension portion 131, and at least part of the circulation channel 140 forms a bent segment 142 through the extension portion 131. Understandably, air passing through a bent channel gets an additional resistance due to a change in flow direction, and such a resistance effectively slows down airflow. Therefore, in the circulation mode, the speed of the airflow after passing through the bent segment 142 will effectively descend, thereby slowing down the airflow passing through the evaporator 310, so that the contact time between the air and the evaporator 310 is longer, thereby sufficient air cooling or heating is achieved.

It should also be noted that during operation, the area through which the airflow can pass is called a ventilation area. The ventilation area of the evaporator 310 is a first ventilation area $S_1$, and the ventilation area of the air inlet 141 is a second ventilation area $S_2$, and the ventilation area of the lower air vent 152 is a third ventilation area $S_3$. There is a condition that meets $S_1 > S_2$, and $S_1 > S_3$ In the case of stable ventilation, the first ventilation area $S_1$ is larger than the second ventilation area $S_2$, representing a diffusion channel formed by the circulation channel 140, which slows down the airflow in the channel and slows down the airflow passing through the evaporator 310; meanwhile, the first ventilation area $S_1$ is larger than the third ventilation area $S_3$, representing a converging channel formed by the ventilation channel 150, which prolongs the residence time of the air staying in the evaporator 310. In this way, the air can be sufficiently cooled or heated by the evaporator 310, ensuring the effect and efficiency of the evaporator 310 for temperature regulation.

Furthermore, as shown in FIG. 5, the evaporator 310 surrounds the ventilation channel 150, so that the volume of the evaporator 310 is larger, and the area through which air can pass is larger, that is, the first ventilation area $S_1$ is larger, so that the airflow passing through the evaporator 310 further slows down, while the evaporator 310 can cool or heat more air, ensuring the effect and efficiency of the evaporator 310 for temperature regulation.

It should be emphasized that compared with the prior art, the ventilation rooftop air-conditioning system 10 according to the present invention effectively slows down airflow through the above special design, so that the air passes slowly through the evaporator 310, making it possible to prolong the residence time of the air staying in the evaporator 310, and for the evaporator 310 to sufficiently cool and heat the air, ensuring the effect and efficiency of the ventilation rooftop air-conditioning system 10 for temperature regulation.

In some examples, the air-conditioning unit 300 has a corresponding filtration structure, which is configured to remove suspended particulate matter and harmful substances in air, achieving the air purifying effect.

As shown in FIG. 4 and FIG. 6, the air-conditioning unit 300 comprises a first filtering element 350, and the first filtering element 350 is disposed in the upper area 153, and the first filtering element 350 is arranged to block the ventilation channel 150. In this way, the first filtering element 350 can filter the air entering the interior of the vehicle from outside, ensuring the cleanliness of the air in the interior of the vehicle.

The air-conditioning unit 300 further comprises a second filtering element 360, and the second filtering element 360 is disposed in the circulation channel 140, and the second filtering element 360 is arranged to block the circulation channel 140. In this way, the second filtering element 360 can filter the air in the interior of the vehicle, ensuring the cleanliness of the air in the interior of the vehicle.

Preferably, the filtration precision of the second filtering element 360 is better than that of the first filtering element 350, and the filtration precision difference between the precision values of the two is not less than 20 m. It can be understood that the impurities and harmful substances in the outside air are usually more abundant than those in the in-cabin air. Using a filtering structure with higher filtration precision to filter the outside air may cause the filtering structure to become clogged, thereby affecting the air intake effect.

Figure 7:
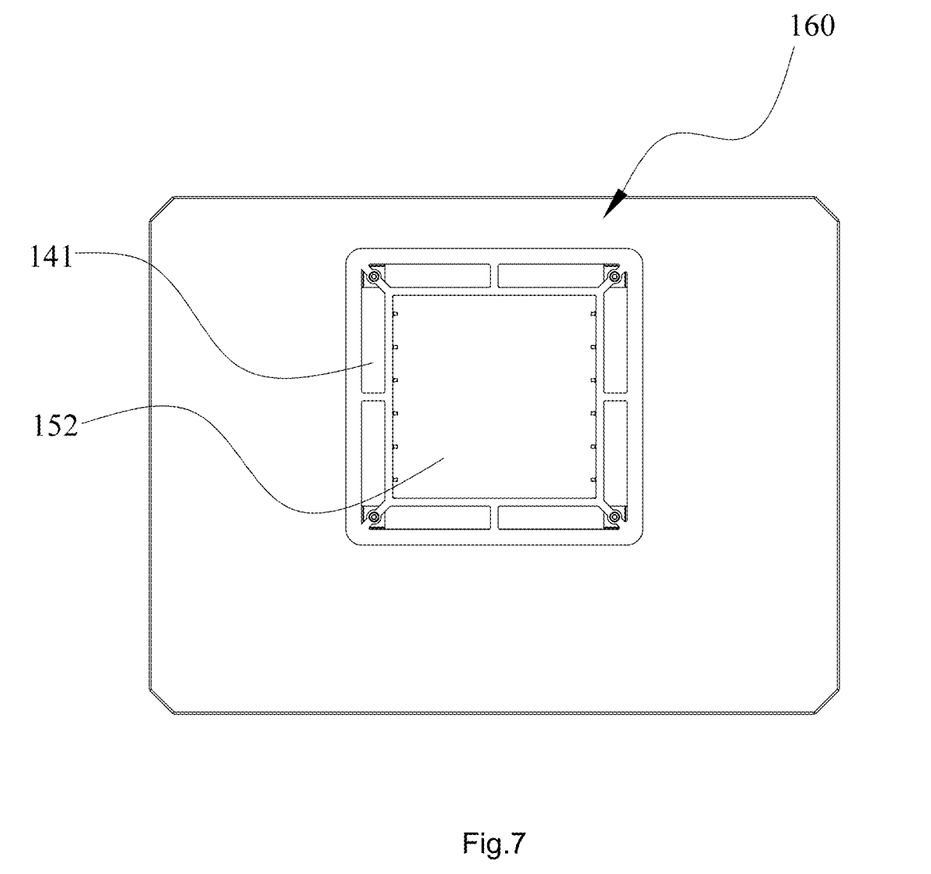
FIG. 7 is a bottom view of the ventilation rooftop air-conditioning system shown in FIG. 1.

In some examples, as shown in FIG. 2 and FIG. 7, the housing unit 100 comprises a grille element 170 which covers the air inlet 141. The grille element 170 can hinder big particle-sized impurities such as masses of dust, hair, and paper scraps from entering the circulation channel 140, thereby protecting the evaporator 310 and avoiding the problem of making the evaporator 310 dirty with impurities.

In some examples, as shown in FIG. 2 and FIG. 7, the lower air vent 152 is provided with a plurality of deflecting plates 180, and the plurality of deflecting plates 180 are arrayed and arranged in parallel. Preferably, as shown in FIG. 4, an angle $\alpha$ is defined between the deflecting plates 180 and the top of the vehicle, wherein $0° < \alpha < 135°$, the user can adjust the angle $\alpha$ according to needs, and the deflecting plates 180 guide the airflow and optimize airflow distribution, thereby improving the user experience.

As shown in FIG. 1 and FIG. 5, the air-conditioning unit 300 comprises a condenser 320, a condensing fan 330 and a compressor 340, and the condensing fan 330 is disposed on the condenser 320, and the condenser 320 is connected with the evaporator 310 through the compressor 340. Taking refrigeration operation as an example, a circulating condensing agent absorbs heat at the evaporator 310 and releases heat during flowing through the condenser 320, and the condensing fan 330 is used to improve the efficiency of the condenser 320 for heat release, and the compressor 340 drives the refrigerant cycle of the condensing agent of the condenser 340.

In some examples, as shown in FIG. 1, FIG. 2 and FIG. 5, the housing unit 100 comprises abase 160, and the main body 110, the compressor 340 and the condenser 320 are mounted on the base 160, and at least part of the main body 110 penetrates through the base 160. In this way, the base 160 integrates the main body 110, the compressor 340 and the condenser 320 into one unit, so there is no need to mount multiple units separately during installation, the user only need to mount the base 160, so as to reduce steps for mounting and facilitate disassembling and assembling the of the ventilation rooftop air-conditioning system 10. Specifically, the base 160 can be mounted on the top of the vehicle, and a mounting hole for mounting the ventilation rooftop air-conditioning system 10 is set on the top of the vehicle, and the part of the main body 110 penetrating the base 160 can pass through the mounting hole to reach into the interior of the vehicle. By way of mating the part of the main body 110 penetrating the base 160 to the mounting hole, the ventilation rooftop air-conditioning system 10 can be positioned during installation, making it convenient to install the ventilation rooftop air-conditioning system 10, and it is possible to make the ventilation rooftop air-conditioning system 10 stick in its position after installation, ensuring stability of installation.

Figure 11:
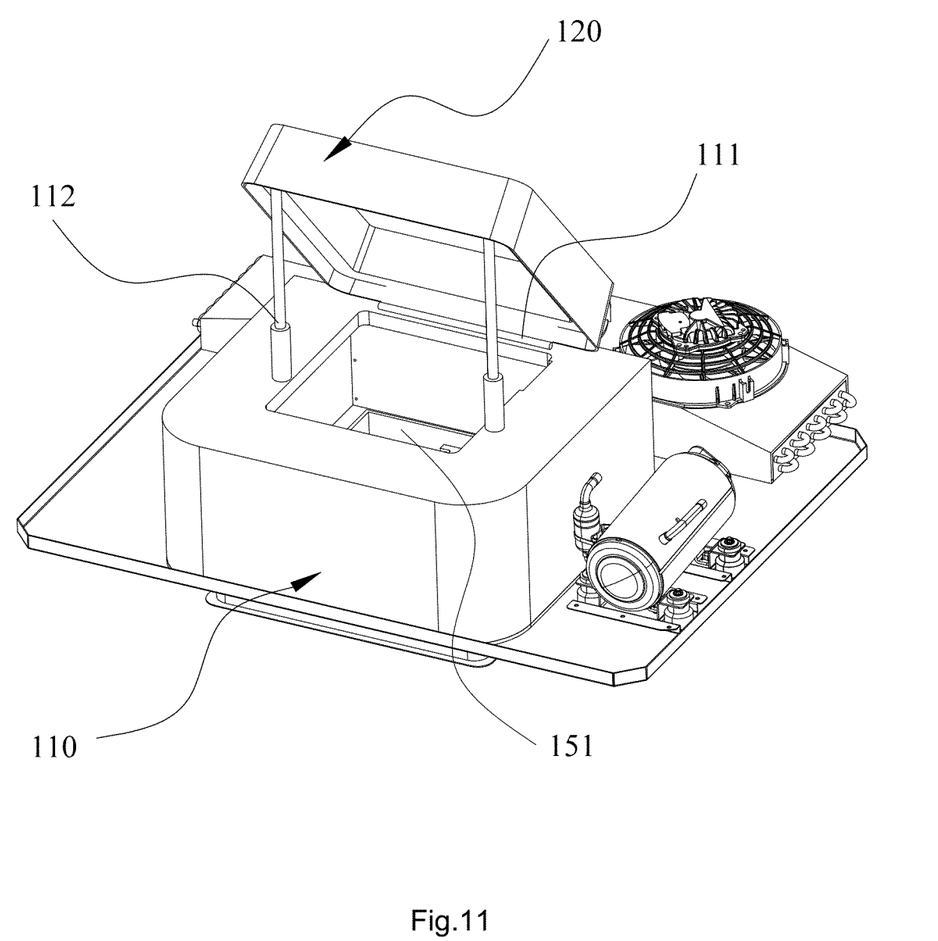
FIG. 11 is a schematic view of the ventilation rooftop air-conditioning system in one example.

In some examples, as shown in FIG. 11, a rotating shaft 111 and a lifting rod 112 are set on the main body 110, and the lid body 120 rotates with respect to the rotating shaft 111 to open or close the upper air vent 151 and the lifting rod 112 is configured to drive the lid body 120 to rotate with respect to the rotating shaft 111 to cover the upper air vent 151. In this way, the user can open or close the upper air vent 151 by controlling an ascending and descending mechanism 113, thereby improving user experience by eliminating the manual operation. Preferably, as shown in FIG. 11, the lifting rod 112 is hydraulically controlled, so that the lifting rod 112 has a self-locking function to accurately position the lid body 120 at any angle.

Figure 12:
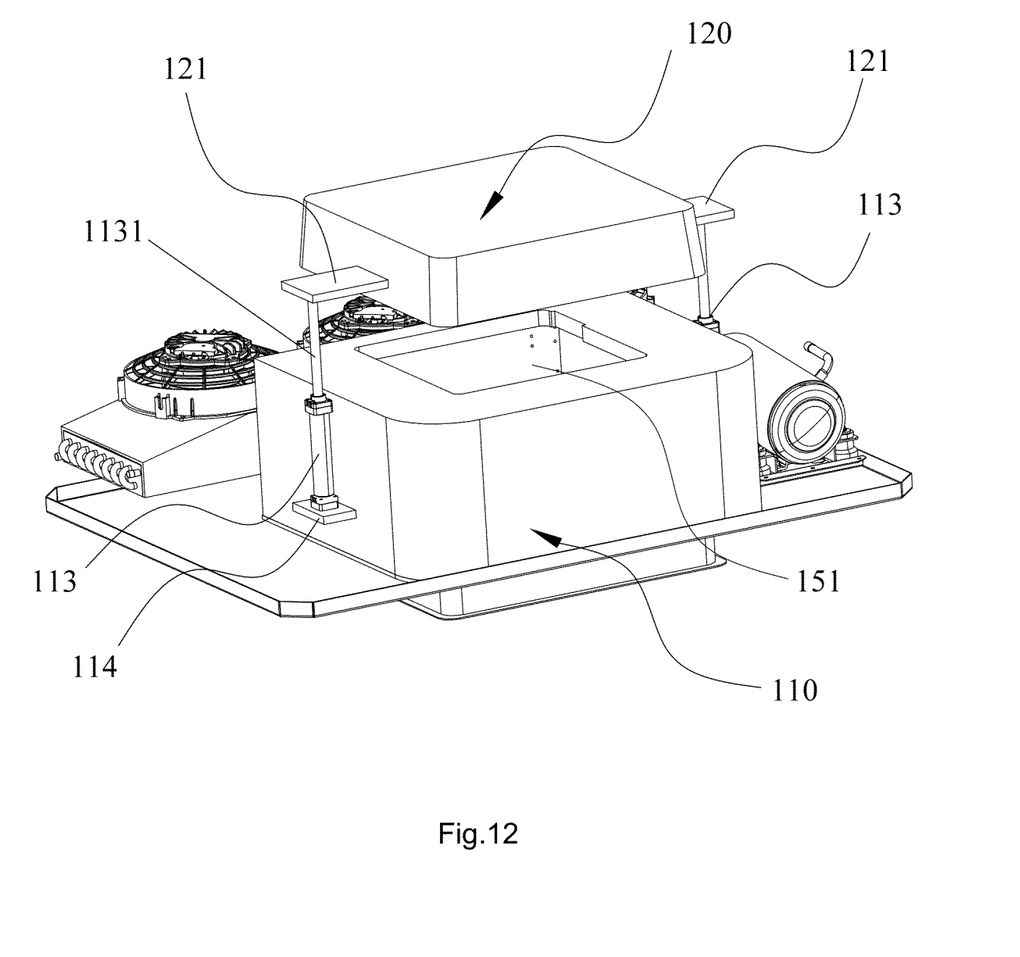
FIG. 12 is a schematic view of the ventilation rooftop air-conditioning system in another example.

In some examples, as shown in FIG. 12 and FIG. 3, the ascending and descending mechanism 113 is disposed on the main body 110, and the ascending and descending mechanism 113 is configured to drive the lid body 120 to approach or move away from the upper air vent 151. Understandably, after the ascending and descending mechanism 113 drives the lid body 120 to move away from the upper air vent 151, the lid body 120 still lies above the upper air vent 151 and covers the upper air vent 151. Therefore, in rainy and snowy weather, the lid body 120 can shelter the upper air vent 151 from rain or snowflakes to prevent them from passing through the ventilation channel 150 and falling into the interior of the vehicle.

Specifically, a first support plate 121 is disposed on the lid body 120, and a second support plate 114 is disposed on the main body 110, and the ascending and descending mechanism 113 is disposed on the second support plate 114, and one end of the ascending and descending mechanism 113, away from the second support plate 114, is connected with the first support plate 121.

In addition, the number of the ascending and descending mechanisms 113 is two, and the two ascending and descending mechanisms 113 are respectively arranged on two sides of the main body 110, so as to effectively improve the stability of the lid body 120 when it ascends or descends with respect to the main body 110. Understandably, the number of the first support plates 121 and the number of the second support plates 114 are also two. Preferably, as shown in FIG. 12, the ascending and descending mechanism 113 is a cylinder structure, and a reciprocating shaft 1131 of the ascending and descending mechanism 113 is connected with the lid body 120.

To sum up, the ventilation rooftop air-conditioning system 10 according to the present invention decreases occupied spaces, reduces use costs and improves user experience while taking into account temperature regulation and air purification.

The above examples only express several embodiments of the present invention, and descriptions to them are more specific and detailed, but they cannot be understood as a limitation to the scope of the present invention. It should be noted that a person skilled in the art may make a number of modifications and improvements without departing from the concept of the present invention, which fall within the protection scope of the invention. Therefore, the protection scope of the invention patent shall be subject to the attached claims.

What is claimed is:

1. A ventilation rooftop air-conditioning system, comprising:
    a housing unit comprising a main body, a lid body and a fixing element disposed in the main body to define a circulation channel and a ventilation channel, wherein the circulation channel has an air inlet, and the ventilation channel has an upper air vent and a lower air vent, wherein the upper air vent is opened or closed by means of the lid body;
    an air blower unit disposed between the upper vent and the lower air vent; and
    an air-conditioning unit which comprises an evaporator which is disposed on the fixing element, wherein the circulation channel is communicated to the ventilation channel through the evaporator;
    wherein the ventilation rooftop air-conditioning system has a ventilation mode in which air flows in the ventilation channel and does not pass through the evaporator and a circulation mode in which air passes through the circulation channel, the evaporator and the ventilation channel in turn.

2. The ventilation rooftop air-conditioning system according to claim 1, wherein the ventilation channel has an upper area and a lower area, and the air blower unit is disposed between the upper area and the lower area, and the evaporator is disposed within the upper area.

3. The ventilation rooftop air-conditioning system according to claim 2, wherein the air-conditioning unit comprises a first filtering element and a second filtering element, and the first filtering element is disposed in the upper area, and the first filtering element is arranged to block the ventilation channel; the second filtering element is disposed in the circulation channel to block the circulation channel.

4. The ventilation rooftop air-conditioning system according to claim 1, wherein the fixing element has an extension portion which extends in a direction away from the ventilation channel, and the evaporator is connected to the extension portion, and at least part of the circulation channel forms a bent segment through the extension portion.

5. The ventilation rooftop air-conditioning system according to claim 1, wherein a ventilation area of the evaporator is a first ventilation area $S_1$, and a ventilation area of the air inlet is a second ventilation area $S_2$, and a ventilation area of the lower air vent is a third ventilation area $S_3$, wherein $S_1 > S_2$, and $S_1 > S_3$.

6. The ventilation rooftop air-conditioning system according to claim 1, wherein the air blower unit comprises a reversible motor having an output shaft, a connecting frame and a plurality of blades, and the reversible motor is fixed and installed in the ventilation channel through the connecting frame, and the plurality of blades are arrayed on the output shaft of the reversible motor, and the reversible motor drives the plurality of blades to rotate clockwise or counterclockwise.

7. The ventilation rooftop air-conditioning system according to claim 1, wherein the air-conditioning unit comprises a condenser, a condensing fan and a compressor, and the condensing fan is disposed on the condenser, and the condenser is connected with the evaporator through the compressor.

8. The ventilation rooftop air-conditioning system according to claim 7, wherein the housing unit comprises a base, and the main body, the compressor and the condenser are mounted on the base, and at least part of the main body penetrates through the base.

9. The ventilation rooftop air-conditioning system according to claim 1, wherein the housing unit comprises a grille element which covers the air inlet.

10. The ventilation rooftop air-conditioning system according to claim 1, wherein the lower air vent is provided with a plurality of deflecting plates which are arrayed and arranged in parallel.

11. The ventilation rooftop air-conditioning system according to claim 1, wherein a rotating shaft and a lifting rod are set on the main body, and the lifting rod is configured to drive the lid body to rotate with respect to the rotating shaft to open or close the upper air vent.

12. The ventilation rooftop air-conditioning system according to claim 1, wherein an ascending and descending mechanism is disposed on the main body to drive the lid body to approach or move away from the upper air vent.

13. The ventilation rooftop air-conditioning system according to claim 12, wherein the ascending and descending mechanism is a cylinder, and a reciprocating shaft of the ascending and descending mechanism is connected with the lid body.

* * * * *